United States Patent
Coty et al.

(10) Patent No.: US 8,610,541 B2
(45) Date of Patent: Dec. 17, 2013

(54) METHOD AND APPARATUS FOR MONITORING A RADIO FREQUENCY IDENTIFICATION NETWORK

(75) Inventors: Constance Coty, White House, NJ (US);
Rittwik Jana, Parsippany, NJ (US);
Arthur Zaifman, Millburn, NJ (US)

(73) Assignee: AT&T Intellectual Property II, L.P., Atlanta, GA (US)

(*) Notice: Subject to any disclaimer, the term of this patent is extended or adjusted under 35 U.S.C. 154(b) by 925 days.

(21) Appl. No.: 11/618,879

(22) Filed: Dec. 31, 2006

(65) Prior Publication Data
US 2008/0157923 A1    Jul. 3, 2008

(51) Int. Cl.
*H04Q 5/22* (2006.01)
*B60Q 1/00* (2006.01)

(52) U.S. Cl.
USPC ......................................... 340/10.1; 340/438

(58) Field of Classification Search
USPC ................................ 340/10.1, 825
See application file for complete search history.

(56) References Cited

U.S. PATENT DOCUMENTS

| | | | | |
|---|---|---|---|---|
| 3,877,002 A | * | 4/1975 | Cheal et al. | 340/552 |
| 5,532,680 A | * | 7/1996 | Ousborne | 340/567 |
| 5,642,484 A | * | 6/1997 | Harrison et al. | 705/14 |
| 5,969,595 A | * | 10/1999 | Schipper et al. | 340/426.19 |
| 2003/0144011 A1 | * | 7/2003 | Richards et al. | 455/456 |
| 2005/0012613 A1 | * | 1/2005 | Eckstein et al. | 340/539.13 |
| 2006/0022815 A1 | * | 2/2006 | Fischer et al. | 340/505 |
| 2006/0099959 A1 | * | 5/2006 | Staton et al. | 455/456.1 |
| 2006/0124738 A1 | * | 6/2006 | Wang et al. | 235/385 |
| 2007/0176749 A1 | * | 8/2007 | Boyd | 340/10.1 |
| 2008/0284600 A1 | * | 11/2008 | Drzaic et al. | 340/572.1 |

FOREIGN PATENT DOCUMENTS

| | | | |
|---|---|---|---|
| JP | 11242723 | A | 9/1999 |
| JP | 2000043728 | A | 2/2000 |
| JP | 2002007978 | A | 1/2002 |
| JP | 2004102992 | A | 4/2004 |
| JP | 2005228292 | A | 8/2005 |
| JP | 2006048198 | A | 2/2006 |
| WO | WO 2006-115756 | A1 | 11/2006 |
| WO | WO-2006/115756 | A1 | 11/2006 |

OTHER PUBLICATIONS

European Search Report Application No. 07122853.0—8 pages—Mailed Jul. 8, 2010. AT&T Applicant.
Examiner Office Letter for JP 2007-338461, May 11, 2012, pp. 1-8.

* cited by examiner

*Primary Examiner* — Brian Zimmerman
*Assistant Examiner* — Cal Eustaquio

(57) ABSTRACT

A method and system for monitoring one or more wireless channels of an Radio Frequency Identification (RFID) network are disclosed. For example, the method reads one or more RFID reference tags periodically to obtain RFID reference tag reading results for each time interval. The method then processes the RFID reference tag reading results for monitoring the one or more wireless channels of the RFID network.

19 Claims, 7 Drawing Sheets

100

200

300

400

500

600

METHOD AND APPARATUS FOR MONITORING A RADIO FREQUENCY IDENTIFICATION NETWORK

The present invention relates generally to Radio Frequency Identification (RFID) Network and, more particularly, to a method and apparatus for monitoring the wireless channels of an RFID Network.

BACKGROUND OF THE INVENTION

In current RFID networks, the last hop wireless channel is not monitored and typical RFID network monitoring systems can only guarantee a level of assurance up to the RFID readers. For example, existing RFID network monitoring only covers the wired components, such as the RFID reader and RFID printer devices, of the RFID network. The wireless channels between RFID tags and a RFID antenna are not covered at all by the existing RFID network monitoring systems. As such, faults, performance, or other problems related to the wireless channels cannot be identified or detected. This causes the overall troubleshooting of the RFID network, especially the wireless portion, extremely difficult.

Therefore, a need exists for a method and apparatus for monitoring the wireless channels of an RFID network.

SUMMARY OF THE INVENTION

In one embodiment, the present invention discloses a method and system for monitoring one or more wireless channels of an Radio Frequency Identification (RFID) network. For example, the method reads one or more RFID reference tags periodically to obtain RFID reference tag reading results for each time interval. The method then processes the RFID reference tag reading results for monitoring the one or more wireless channels of the RFID network.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
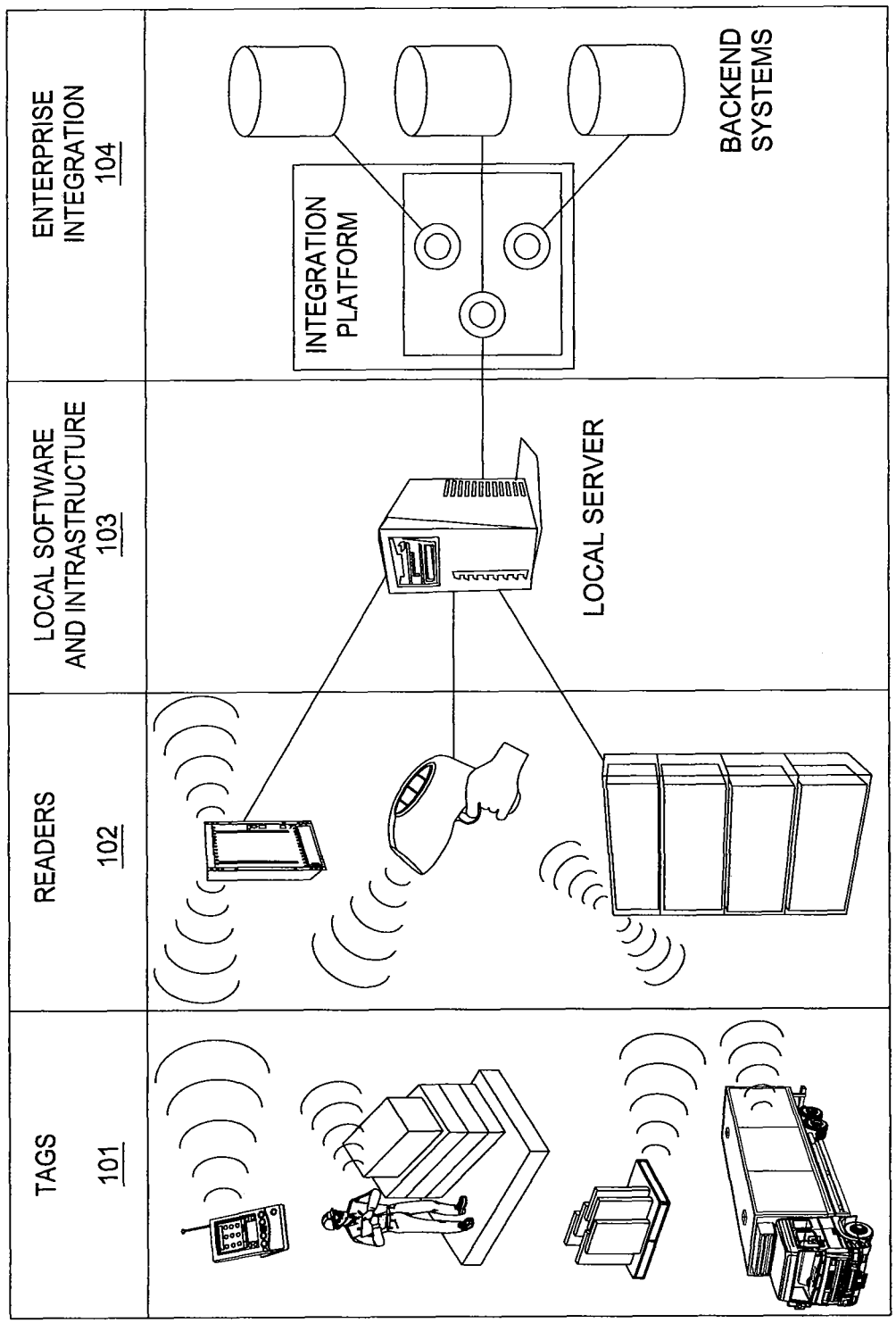
FIG. 1 illustrates an exemplary RFID system related to the present invention.

In current RFID networks, the wireless channels between RFID tags and a RFID antenna are not covered at all by the existing RFID network monitoring systems. As such, faults, performance, or other problems related to the wireless channels cannot be identified or detected. This causes the overall troubleshooting of the RFID network, especially the wireless portion, extremely difficult.

To address this need, the present invention enables a system for facilitating end to end monitoring of a typical RFID network, including the wireless portion of the network between the RFID and the reader. In one embodiment, the present invention monitors "heartbeats" from well known reference tags placed in the vicinity of RFID antennae so that RFID edge servers and backend applications can expect to obtain a confident reading from these reference tags at all times. This assures a level of guarantee from a network monitoring standpoint of the wireless access channel that the reader uses to interrogate the tag. The readings of the reference tags can be stored and analyzed to provide performance status, fault management, and even tracking applications of the wireless portion of the RFID network.

In one embodiment, the present invention enables the monitoring of the wireless channel in an RFID network that the RFID reader uses to interrogate the tags. The monitoring of the RFID channels enables the RFID network to incorporate a level of confidence for the wireless edge, between RFID tags and RFID antenna, by placing reference tags in the vicinity of the antenna that radiates power to energize the tags. These reference tags can be deployed in specific strategic locations by the user with different polarizations, sizes and orientation. Reference tags can be passive or active.

In one embodiment, the present invention can also be used in conjunction with proximity sensors that are typically used to power on the antenna as an object is detected approaching it. The "heartbeats" that are disseminated either as a result of the RFID reader querying the passive tag per round interval or issued as a result of the active tag waking up, provides an estimate of the quality of the wireless channel that is used to relay information between the reader and the tag. For example, if a particular RFID reference tag cannot be read by the reader, it may imply that the RFID channel used to query the reference tag may be experiencing difficulty or other conditions that need further investigations. Readers can also vary their effective power level to change the distance that is used to query the reference tags.

The present invention enables:
an estimate of the quality of the wireless link between the RFID reader and the reference tags in an RFID network;
a truly end-to-end system monitoring where existing monitoring systems are only able to monitor the health of the RFID network up to the reader and/or the antenna; and
an extension of monitoring the wireless channels to any existing RFID network monitoring system.

FIG. 1 illustrates an exemplary RFID system 100 related to the present invention. Tags 101 attached to entities, such as objects, packages and/or individuals to be tracked, are interrogated by readers 102. Readers 102, often controlled by local server 103, then send the RFID data retrieved from tags 101 to an enterprise integration platform 104, e.g., middleware servers, for further processing and aggregation of the collected data. RFID can be viewed as a replacement to the barcode, or a more advanced technology that can provide enhanced functionality in addition to the functions provided by the traditional barcode. RFID has many advantages; for example, readers 102 and tags 101 do not have to be in direct line of sight, tags 101 can contain serial number information as well as product data of an object being tracked, and tags 101 can be made much more rugged and durable.

Figure 2:
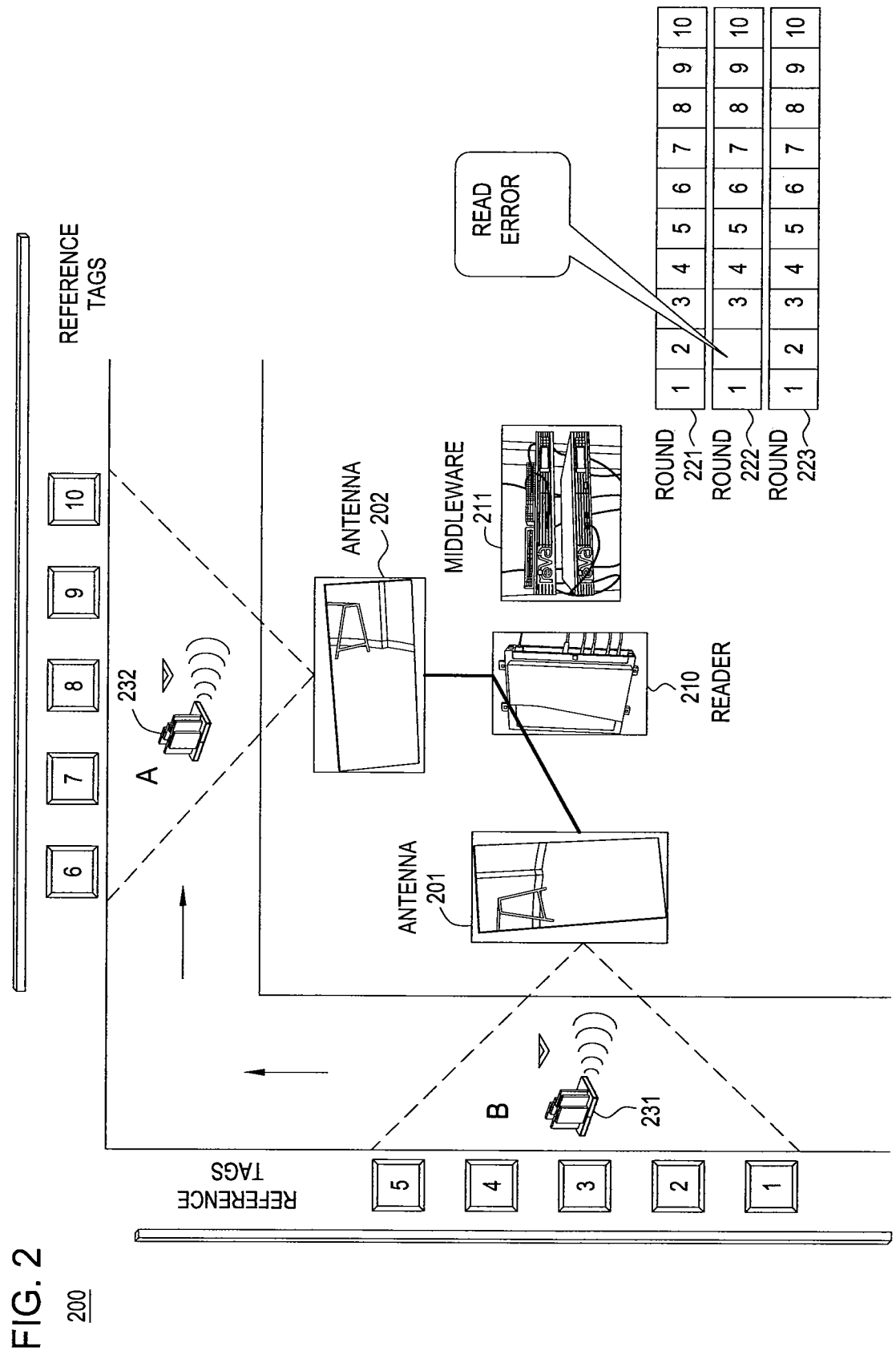
FIG. 2 illustrates an example of using exemplary reference RFID tags in the present invention.

In one embodiment of the present invention, references tags known apriori to the backend Enterprise Integration platform are placed at suitable positions close to the reader antenna. FIG. 2 illustrates a network 200 using the exemplary reference RFID tags in the present invention. For example, the reference tags, 1 through 10, are read periodically, e.g., each round of time interval and, under normal operating conditions, all tags can be read via antenna 201 and antenna 202 by reader 210. This provides a heartbeat mechanism that can be aggregated and processed at the middleware server 211. The heartbeats provide a way of estimating the ability of an RFID antenna in successfully reading the reference tags.

Under abnormal conditions one of these tags may fail to be read. For instance, in reading round interval 221, all 10 reference tags are read successfully via the antenna by the reader. The successful reading result is then stored and processed by middleware sever 211. However, in reading round interval 222, reference tag 2 cannot be read in the current reading round interval. The reading result with reference tag 2 missing from the successful reading is then stored and processed later by the middleware server 211. The fact that reference tag 2 cannot be read properly may be attributed to problems caused by the tag, the wireless channel, or an interfering object blocking reference tag 2. In reading round interval 223, all 10 reference tags are again read successfully via the antenna by the reader. The successful reading result is then stored and processed by middleware sever 211. At this point, it can be deduced through further processing by the middleware server 211 that a transient problem has caused reference tag 2 not to be read properly during reading round interval 222. Note that the time period between the beginnings of the two consecutive reading round intervals is a configurable parameter set by the user.

In one embodiment, the present invention can be used as a physical movement tracking device, e.g., deriving a motion sequence of an entity traversing through the RFID network. In FIG. 2, two objects, such as package A and package B, is moving in the direction from position 231 toward position 232. Note that Object A and Object B are both attached with their own RFID tags for identification purposes as well. The objects have the physical size such that it traverses two antenna beam widths of antenna 201 and antenna 202.

Figure 3:
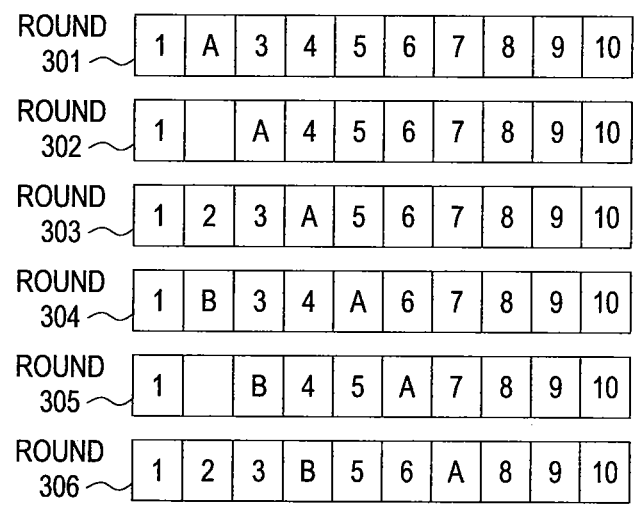
FIG. 3 illustrates an exemplary time sequence reading round interval results with respect to moving objects in FIG. 2 of the present invention.

FIG. 3 illustrates an exemplary time sequence or time series of reading round interval results 300 with respect to moving objects in FIG. 2 of the present invention. During reading round interval 301 to reading round interval 304, the position of object A is in the monitoring region covered by reference tags 1 to 5 and antenna 201.

To illustrate, in reading round interval 301, Object A is blocking reference tag 2; therefore, reference tag 2 cannot be read successfully by antenna 201 but antenna 201 properly reads the RFID tag attached to Object A. The result of this reading round interval implies that Object A is near the position of reference tag 2.

In reading round interval 302, Object A is now blocking reference tags 2 and 3 at the same time and causes reference tags 2 and 3 not be read successfully. In addition, the RFID tag of Object A is now read by the antenna successfully. The result of this reading round interval implies that Object A is near reference tags 2 and 3 and causes them not be to read successfully.

In reading round interval 303, Object A is now blocking reference tag 4; therefore, reference tag 4 cannot be read successfully by antenna 201 but antenna 201 properly reads the RFID tag attached to Object A. The result of this reading round interval implies that Object A is near the position of reference tag 4.

In reading round interval 304, Object A is now blocking reference tag 5; therefore, reference tag 5 cannot be read successfully by antenna 201 but antenna 201 properly reads the RFID tag attached to Object A. The result of this reading round interval implies that Object A is near the position of reference tag 5. In the same reading round interval, 304, Object B now enters the region covered by reference tags 1 to 5 and antenna 201. Object B is now blocking reference tag 2; therefore, reference tag 2 cannot be read successfully by antenna 201 but antenna 201 properly reads the RFID tag attached to Object B. The result of this reading round interval implies that Object B is near the position of reference tag 2.

During reading round interval 305 to reading round interval 306, the position of object A is in the monitoring region covered by reference tags 6 to 10 and antenna 202, while Object B is in the monitoring region covered by reference tags 1 to 5 and antenna 201.

In reading round interval 305, Object A is now blocking reference tag 6; therefore, reference tag 6 cannot be read successfully by antenna 202 but antenna 202 properly reads the RFID tag attached to Object A. In the same reading round interval, Object B is now blocking reference tags 2 and 3; therefore, reference tags 2 and 3 cannot be read successfully by antenna 201 but antenna 201 properly reads the RFID tag attached to Object B. The result of this reading round interval implies that Object A is near the position of reference tag 6 and Object B is near the position of reference tags 2 and 3.

In reading round interval 306, Object A is now blocking reference tag 7; therefore, reference tag 7 cannot be read successfully by antenna 202 but antenna 202 properly reads the RFID tag attached to Object A. In the same reading round interval, Object B is now blocking reference tag 4; therefore, reference tag 4 cannot be read successfully by antenna 201 but antenna 201 properly reads the RFID tag attached to Object B. The result of this reading round interval implies that Object A is near the position of reference tag 7 and Object B is near the position of reference tag 4.

By analyzing the reading round interval results captured between reading round intervals 301 to 306, the system, such as middleware server 211, can deduce the physical movement of Object A and Object B during these time intervals. For instance, Object A moves from a position near reference tag 2 to reference tag 7 and Object B moves from a position near reference tag 2 to reference tag 4 during these time periods.

In another embodiment, the present invention can similarly be used to record and track physical motion in time sequence of an unidentified object with an unidentified RFID tag or without an attached RFID tag. For instance, if Object A is an object with no RFID tag or an unknown RFID attached to it, it will still cause reading failures of the deployed RFID reference tags as shown in reading round intervals 301 through 306 in time sequence 300 in FIG. 3, except that the successful reading of RFID tag of Object A will be replaced by a failed reading or a successful reading of the unidentified RFID. The time sequence results simply imply that an unidentified object has moved through the space with respect to the deployed RFID reference tags within the reading round intervals as previously described.

In another embodiment, the present invention can be used to compare both long and short term wireless link performance based on past readings of a reference tag. When the short term wireless link performance deviates significantly above or below from the long term one, an alarm is raised to alert the network administrator. For instance, if the short term wireless link performance deviates significantly below the long term one, then it implies there may be problems with the reference tag or the tag is interfered by an unexpected object, such as a misplaced package or even an intruder, near the location of the reference tag in question. If the short term wireless link performance deviates significantly above the long term one, such as the reading success rate goes from 98.0% to 100%, then it may imply that there is a possibility that the reference tag may have been spoofed and raises security concerns of this reading deviation. Note that the long and short term length of the wireless link performance to be analyzed are configurable parameters set by the user to meet specific application or environment needs.

Figure 4:
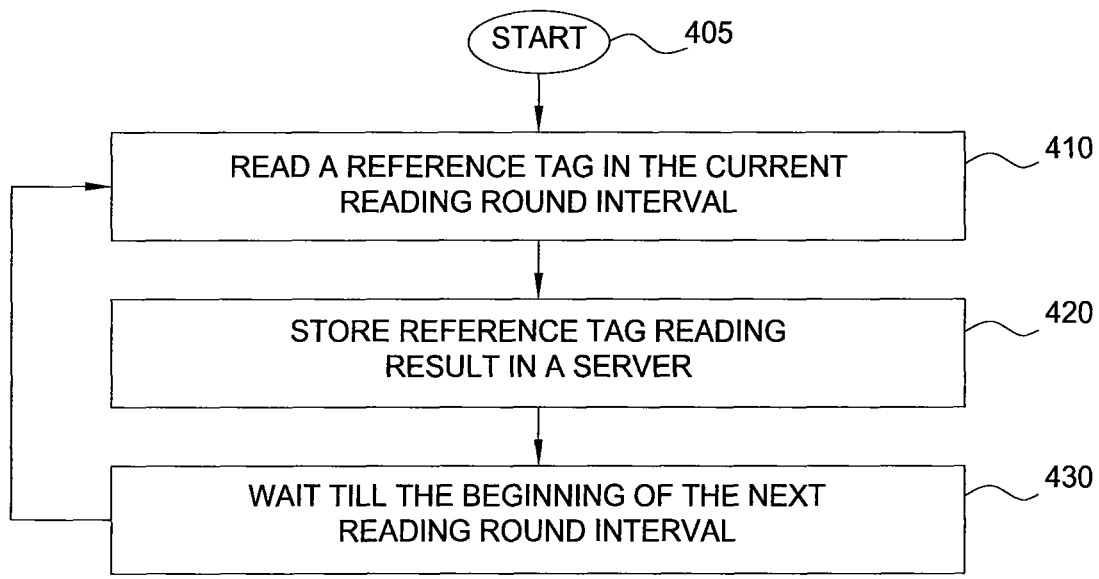
FIG. 4 illustrates a flowchart of a method for monitoring RFID reference tags in an RFID network of the present invention.

FIG. 4 illustrates a flowchart of a method 400 for monitoring RFID reference tags in an RFID network of the present invention. Method 400 starts in step 405 and proceeds to step 410.

In step 410, the method reads a reference tag via a wireless channel to retrieve data from the reference tag. The reference tag can be either a passive or an active RFID tag. Note that the reading of the reference tag serves as a heartbeat indicating the current status of the wireless link connecting the RFID antenna and the reference tag.

In step 420, the reference tag reading result is stored in a server for monitoring and future processing purposes. The server will keep track of the read result of the reference tag and the stored result can be used for further processing depending on the user's needs. The reading result is either a success or a failure of reading the reference tag.

In step 430, the method waits till the beginning of the next reading round interval and then proceeds back to step 410.

Figure 5:
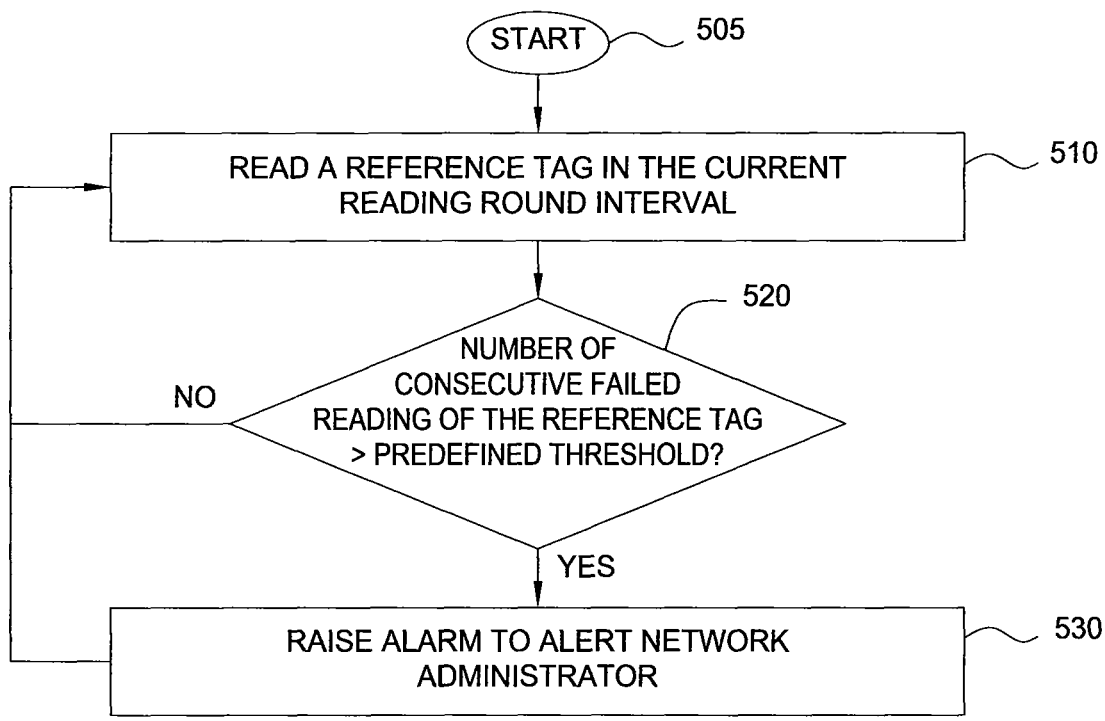
FIG. 5 illustrates a flowchart of a method for monitoring RFID wireless link performance in an RFID network of the present invention.

FIG. 5 illustrates a flowchart of a method 500 for monitoring RFID wireless link performance in an RFID network of the present invention. Method 500 starts in step 505 and proceeds to step 510.

In step 510, the method reads a reference tag via a wireless channel to retrieve data from the reference tag. The reference tag can be either a passive or an active RFID tag. Note that the reading of the reference tag serves as a heartbeat indicating the current status of the wireless link connecting the RFID antenna and the reference tag.

In step 520, the method checks if the number of consecutive failed reading attempts of the reference tag has exceeded a predefined threshold that is set by the user. If the number of consecutive failed reading attempts of the reference tag has exceeded the predefined threshold, the method proceeds to step 530; otherwise, the method proceeds back to step 510.

In step 530, the method sends an alarm to alert the RFID network administrator. For instance, the consecutive failed reading attempts can be due to an unexpected object blocking the reference tag, a failed reference tag, a failed antenna or reader, or even an intruder blocking the reference tag preventing it from being read successfully. Consequently, the network administrator is alerted to dispatch a technician or a security guard to investigate the consecutive failed reading attempts. The method then proceeds back to step 510.

Figure 6:
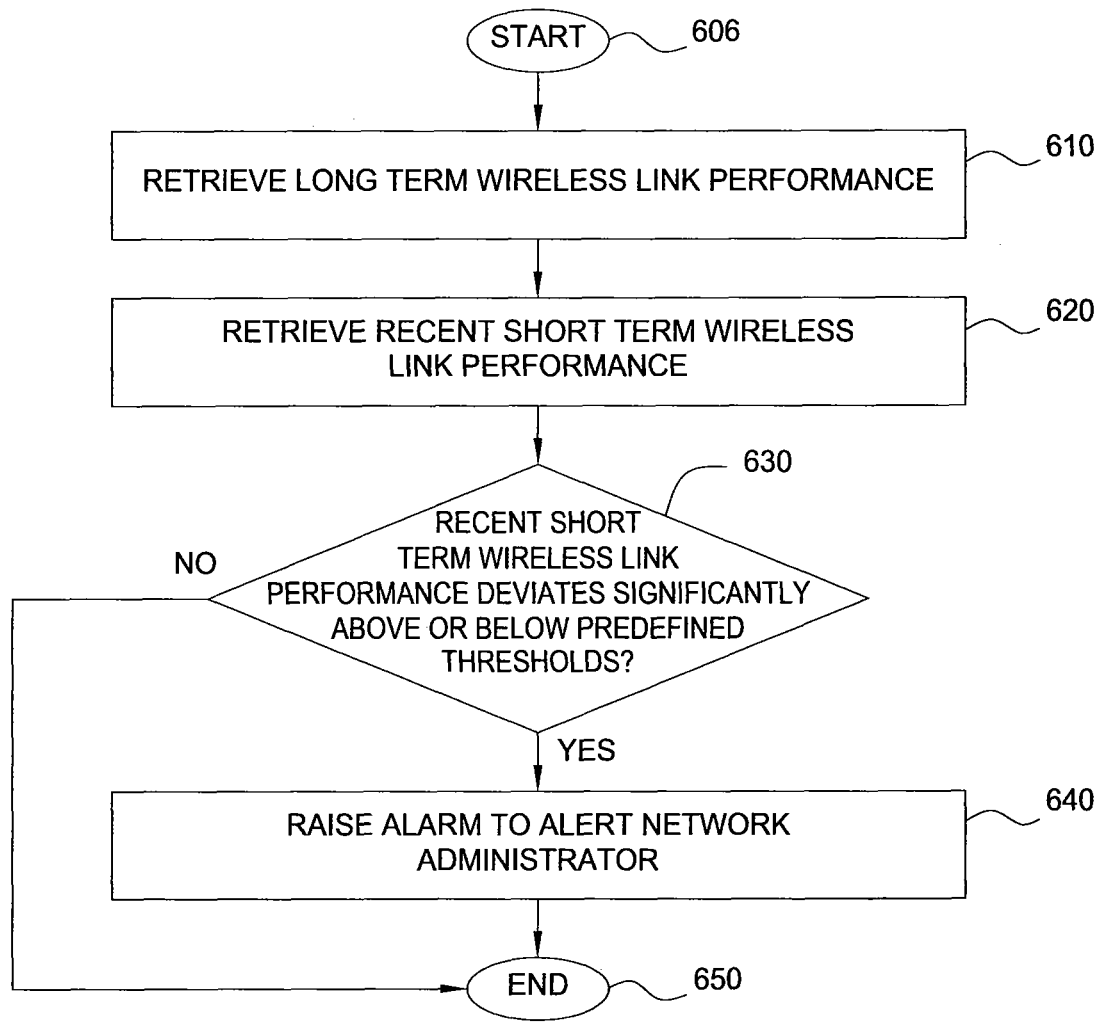
FIG. 6 illustrates a flowchart of a method for comparing long term and short term wireless link performance in an RFID network of the present invention.

FIG. 6 illustrates a flowchart of a method for comparing long term and short term wireless link performance in an RFID network of the present invention. Method 600 starts in step 606 and proceeds to step 610.

In step 610, the method retrieves the long term wireless link performance data of reading a reference tag. Performance data refers to be the success or the failure reading rate of an RFID reference tag. The length of the time periods of the long term performance data to be retrieved is a configurable parameter set by the user.

In step 620, the method retrieves the recent short term wireless link performance data of reading a reference tag. The exact time periods and the length of the time periods of the short term performance data to be retrieved are configurable parameters set by the user.

In step 630, the method checks if the recent short term performance data of reading the reference tag deviates significantly above or below the long term performance data of reading the reference tag. If the short term performance data of reading the reference tag deviates significantly above or below the long term performance data of reading the reference tag, the method proceeds to step 640; otherwise, the method proceeds to step 650.

In step 640, the method raises an alarm to alert the network administrator if such a significant deviation has been detected. For instance, if the short term wireless link performance deviates significantly below the long term one, then it may imply there may be persisting problems related to the reference tag, the antenna, or the reader, or the tag is interfered by an unexpected object, such as a misplaced package or even an intruder, near the location of the reference tag in question. If the recent short term wireless link performance deviates significantly above the long term one, such as reading success rate goes from 98.0% to 100%, then it may imply there may a security risk issue such that the reference tag may have been spoofed. The method ends in step 650.

Figure 8:
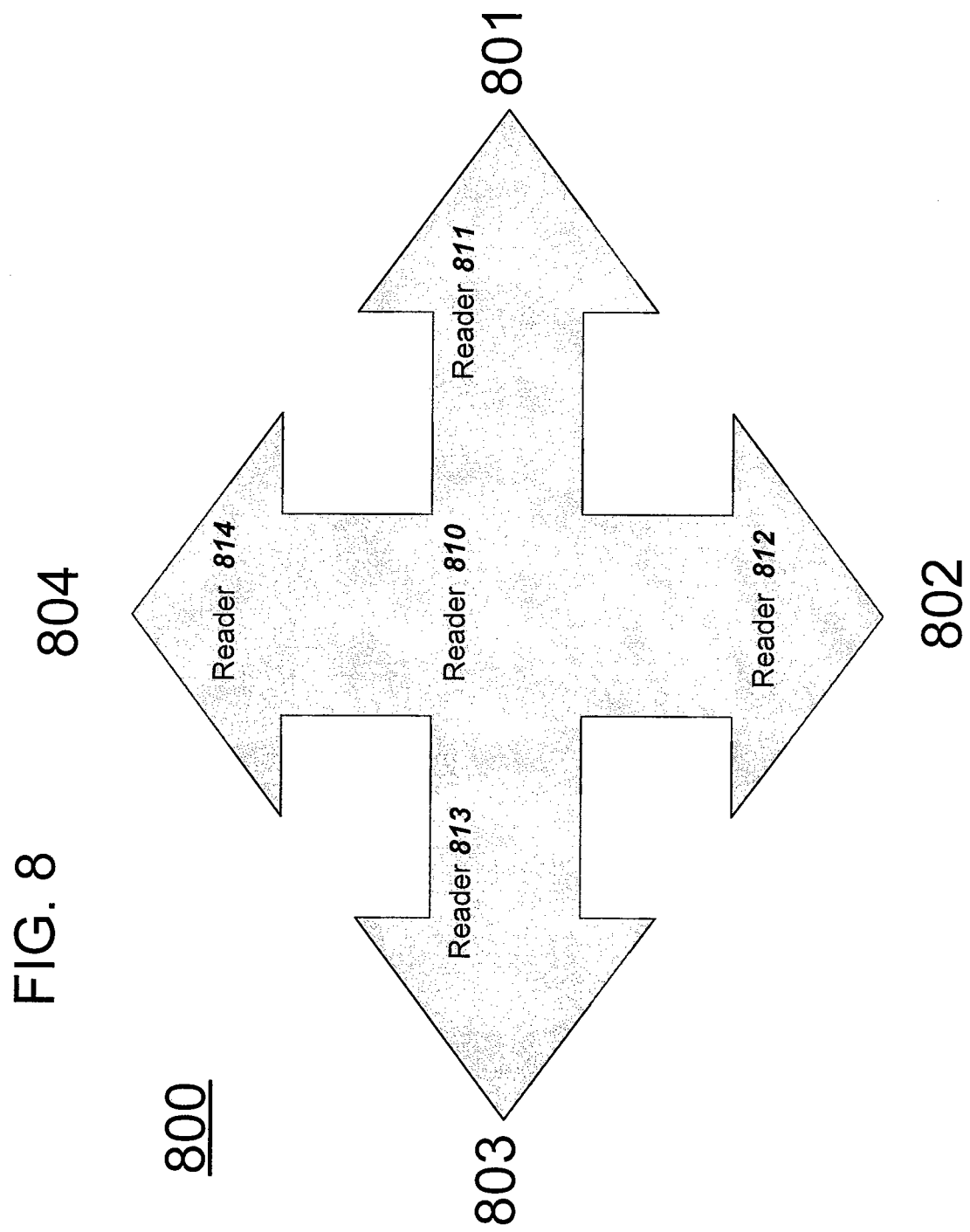
FIG. 8 illustrates an example of searching for a lost RFID tagged object using the worst average of RFID reference tag confidence level readings related to the present invention.

FIG. 8 illustrates an example 800 of searching for a lost RFID tagged object using the worst average of RFID reference tag confidence level readings related to the present invention. When an RFID-tagged object is being tracked for the purpose of determining its current location (where current location may be represented by the fixed location of a particular reader's antenna(e) or by a dynamically determined location through triangulation), it may become lost due to transient conditions resulting in failure of one or more antennae to record the respective object. FIG. 8 shows four corridors, 801, 802, 803, and 804, each comprising a reader/antenna and a set of non-overlapping RFID reference tags. For instance, corridor 801 comprises reader/antenna 811 with its own set of RFID reference tags; corridor 802 comprises reader/antenna 812 with its own set of RFID reference tags; corridor 803 comprises reader/antenna 813 with its own set of RFID reference tags; corridor 804 comprises reader/antenna 814 with its own set of RFID reference tags. At the intersection of the four corridors, reader/antenna 810 is deployed with its own set of RFID reference tags.

At time T, object L is recorded by reader/antenna 810, but at times T+1, T+2 . . . object L cannot be detected by any of the readers/antennae and appears to be lost. Note that object L could have traveled into any one of corridors 801, 802, 803, or 804. In one embodiment of the present invention, a weighted estimate as to where to search for the lost object L first can be calculated by selecting the corridor comprising the reader with the worst average confidence level since object L most likely went undetected as it passed by this particular reader. For example, during the time interval from T to T+N, readers 810, 811, 812, 813, and 814 had average confidence levels, e.g., success rates of reading their associated sets of RFID reference tags, of 98%, 99%, 50%, 99%, 99% respectively. Therefore, it can be determined that the corridor comprising reader 812, corridor 802 should be searched first for the lost object L. In this case, the potential path exhibiting the lowest confidence level since the last known location of the lost object L should be the first choice to search for the lost object.

Figure 7:
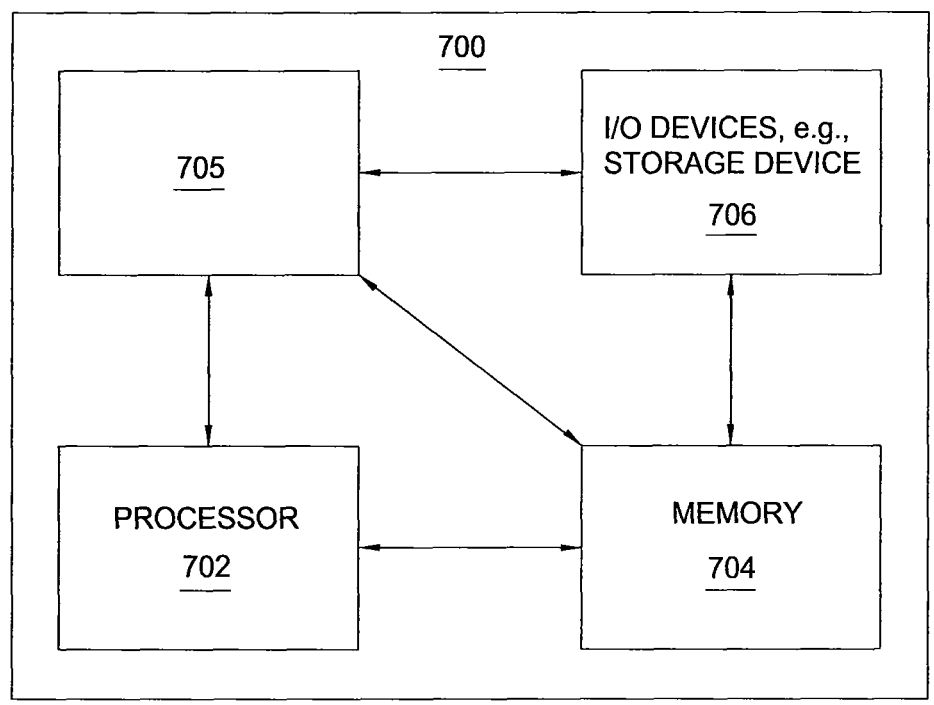
FIG. 7 illustrates a high level block diagram of a general purpose computer suitable for use in performing the functions described herein.

FIG. 7 depicts a high level block diagram of a general purpose computer suitable for use in performing the functions described herein. As depicted in FIG. 7, the system 700 comprises a processor element 702 (e.g., a CPU), a memory 704, e.g., random access memory (RAM) and/or read only memory (ROM), a module 705 for monitoring the wireless channels of an RFID network, and various input/output devices 706 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 705 for monitoring the wireless channels of an RFID network can be loaded into memory 704 and executed by processor 702 to implement the functions as discussed above. As such, the present process 705 for monitoring the wireless channels of an RFID network (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for monitoring one or more wireless channels of a radio frequency identification network, comprising:
    reading one or more radio frequency identification reference tags periodically to obtain radio frequency identification reference tag reading results for each time interval of a plurality of time intervals; and
    processing the radio frequency identification reference tag reading results for monitoring the one or more wireless channels of the radio frequency identification network, wherein the processing comprises:
        identifying a radio frequency identification reader that provides a last known location of a lost radio frequency identification tagged object being tracked;
        calculating an average reading confidence level over a predefined time interval for each of a plurality of radio frequency identification readers located near the identified radio frequency identification reader based on the radio frequency identification reference tag reading results, wherein the average reading confidence level for each of the plurality of radio frequency identification readers comprises a success rate for each of the plurality of radio frequency identification readers in reading a set of radio frequency identification tags associated with each of the plurality of radio frequency identification readers over the predefined time interval;
        determining a radio frequency identification reader of the plurality of radio frequency identification readers located near the identified radio frequency identification reader having a worst average reading confidence level as compared to others of the plurality of radio frequency identification readers located near the identified radio frequency identification reader; and
        searching for the lost radio frequency identification tagged object at a location proximate to the radio frequency identification reader determined to have the worst average reading confidence level.

2. The method of claim 1, wherein the reference radio frequency identification tags are deployed in fixed locations within the radio frequency identification network.

3. The method of claim 1, wherein the radio frequency identification reference tags are read via a radio frequency identification antenna by a radio frequency identification reader.

4. The method of claim 1, wherein the time interval is a configurable parameter set by a user.

5. The method of claim 1, wherein the processing comprises:
    processing the radio frequency identification reference tag reading results within a time series; and
    identifying failed readings and successful readings from the radio frequency identification reference tag reading results within the time series.

6. The method of claim 5, wherein the processing further comprises:
    deriving a motion sequence of an entity traversing through the radio frequency identification network.

7. The method of claim 5, wherein the processing further comprises:
    raising an alarm if the reading results indicate receipt of a predefined number of successive failed readings associated with one or more of the radio frequency identification reference tags.

8. The method of claim 1, wherein the processing comprises:
    retrieving a long term set of the radio frequency identification reference tag reading results;
    retrieving a short term set of the radio frequency identification reference tag reading results;
    comparing the long term set of the radio frequency identification reference tag reading results with the short term set of the radio frequency identification reference tag reading results; and
    raising an alarm if the comparing indicates a deviation.

9. A non-transitory computer-readable medium having stored thereon a plurality of instructions, the plurality of instructions including instructions which, when executed by a processor, cause the processor to perform a method for monitoring one or more wireless channels of a radio frequency identification network, comprising:
    reading one or more radio frequency identification reference tags periodically to obtain radio frequency identification reference tag reading results for each time interval of a plurality of time intervals; and
    processing the radio frequency identification reference tag reading results for monitoring the one or more wireless channels of the radio frequency identification network, wherein the processing comprises:
        identifying a radio frequency identification reader that provides a last known location of a lost radio frequency identification tagged object being tracked;
        calculating an average reading confidence level over a predefined time interval for each of a plurality of radio frequency identification readers located near the identified radio frequency identification reader based on the radio frequency identification reference tag reading results, wherein the average reading confidence level for each of the plurality of radio frequency identification readers comprises a success rate for each of the plurality of radio frequency identification readers in reading a set of radio frequency identification tags associated with each of the plurality of radio frequency identification readers over the predefined time interval;

determining a radio frequency identification reader of the plurality of radio frequency identification readers located near the identified radio frequency identification reader having a worst average reading confidence level as compared to others of the plurality of radio frequency identification readers located near the identified radio frequency identification reader; and searching for the lost radio frequency identification tagged object at a location proximate to the radio frequency identification reader determined to have the worst average reading confidence level.

10. The non-transitory computer-readable medium of claim 9, wherein the reference radio frequency identification tags are deployed in fixed locations within the radio frequency identification network.

11. The non-transitory computer-readable medium of claim 9, wherein the radio frequency identification reference tags are read via a radio frequency identification antenna by a radio frequency identification reader.

12. The non-transitory computer-readable medium of claim 9, wherein the time interval is a configurable parameter set by a user.

13. The non-transitory computer-readable medium of claim 9, wherein the processing comprises: processing the radio frequency identification reference tag reading results within a time series; and identifying failed readings and successful readings from the radio frequency identification reference tag reading results within the time series.

14. The non-transitory computer-readable medium of claim 13, wherein the processing further comprises: deriving a motion sequence of an entity traversing through the radio frequency identification network.

15. The non-transitory computer-readable medium of claim 13, wherein the processing further comprises:
raising an alarm if the reading results indicate receipt of a predefined number of successive failed readings associated with one or more of the radio frequency identification reference tags.

16. The non-transitory computer-readable medium of claim 9, wherein the processing comprises:
retrieving a long term set of the radio frequency identification reference tag reading results;
retrieving a short term set of the radio frequency identification reference tag reading results;
comparing the long term set of the radio frequency identification reference tag reading results with the short term set of the radio frequency identification reference tag reading results; and
raising an alarm if the comparison indicates a deviation.

17. A system for monitoring one or more wireless channels of a radio frequency identification network, comprising:
a plurality of radio frequency identification reference tags deployed within the radio frequency identification network;
a radio frequency identification reader for reading the plurality of radio frequency identification reference tags periodically to obtain radio frequency identification reference tag reading results for each time interval of a plurality of time intervals; and
a server for processing the radio frequency identification reference tag reading results for monitoring the one or more wireless channels of the radio frequency identification network, wherein the server is configured to:
identify a radio frequency identification reader that provides a last known location of a lost radio frequency identification tagged object being tracked;
calculate an average reading confidence level over a predefined time interval for each of a plurality of radio frequency identification readers located near the identified radio frequency identification reader based on the radio frequency identification reference tag reading results, wherein the average reading confidence level for each of the plurality of radio frequency identification readers comprises a success rate for each of the plurality of radio frequency identification readers in reading a set of radio frequency identification tags associated with each of the plurality of radio frequency identification readers over the predefined time interval;
determine a radio frequency identification reader of the plurality of radio frequency identification readers located near the identified radio frequency identification reader having a worst average reading confidence level as compared to others of the plurality of radio frequency identification readers located near the identified radio frequency identification reader; and
search for the lost radio frequency identification tagged object at a location proximate to the radio frequency identification reader determined to have the worst average reading confidence level.

18. The system of claim 17, wherein the server processes the radio frequency identification reference tag reading results within a time series, and identifies failed readings and successful readings from the radio frequency identification reference tag reading results within the time series.

19. The system of claim 18, wherein the server derives a motion sequence of an entity traversing through the radio frequency identification network.

* * * * *